United States Patent Office 2,716,098
Patented Aug. 23, 1955

2,716,098

WATER SOLUBLE CONDENSATION PRODUCTS WITH A TANNING ACTION

Robert Biedermann, Basel, Switzerland, assignor to J. R. Geigy A. G., Basel, Switzerland No Drawing. Application February 7, 1952, Serial No. 270,528

Claims priority, application Switzerland February 13, 1951

6 Claims. (Cl. 260—49)

A process for the production of new condensation products with tanning properties which are distinguished by the valuable properties of the leather obtained therewith has been described. In this process, phenol sulphonic acids which contain at least one replaceable hydrogen atom in the o- or p-position to the phenolic hydroxyl group are condensed in the vacuum at a temperature of 150–190° C. under splitting off of water to form more or less higher molecular polyhydroxy-polyphenyl sulphone sulphonic acids of the general formula [Ph-(SO₂—Ph)$_n$]SO₃H, wherein Ph represents a hydroxyphenyl radical etherified if desired and $n$ represents a whole number. These polyhydroxy-polyphenyl sulphone sulphonic acids are relatively little soluble in water and possess no tanning properties; also no tanning agents which satisfy practical demands are obtained by further condensation with formaldehyde. But surprisingly they can be condensed with urea and formaldehyde to produce very active tanning agents with good water solubility.

On further work being done on this subject it was found that not only these condensation products are suitable but also in general those which are obtainable by condensation in the vacuum at 150–190° of phenol sulphonic acids with at least one replaceable hydrogen atom in the o- or p-position to the hydroxyl group with sulphonic acids of the benzene and naphthalene series which have no hydroxyl groups. It is surprising that the production of such mixed hydroxypolyarylsulphone sulphonic acids is possible as sulphonic acids of the benzene and naphthalene series having no hydroxyl groups are not capable by themselves under the pertaining reaction conditions of a polycondensation under splitting off of water and formation of sulphonyl groups. Naturally, in this condensation, these aromatic sulphonic acids of the benzene and naphthalene series may be used in at the most equimolecular amounts to the phenol sulphonic acid; it is advantageous, however, to use lesser amounts. It has been found possible to use for example the methylbenzene, halogen benzene and the napthalene sulphonic acids: the ortho- and para-toluene sulphonic acids, o-, m- or p-xylene sulphonic acids, p-chlorobenzene sulphonic acid, naphthalene-1- or, advantageously -2-sulphonic acid or technical mixtures thereof. In this way mixtures of hydroxypolyarylsulphone sulphonic acids are obtained. These sulphonic acids are also relatively only slightly soluble in water and have no tanning properties.

It has now further been found—and this forms an important part of the present invention—that the hydroxypolyarylsulphone sulphonic acids of both categories described above presumably of the general formula:

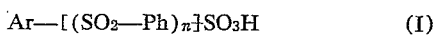

wherein Ar represents an aromatic radical of the benzene and naphthalene series, particularly also a hydroxyphenyl or a naphthyl radical, Ph represents a hydroxyphenyl which may contain substituents such as methyl groups or halogen atoms, and $n$ represents a whole number can be condensed in vacuo at a temperature exceeding 140° C. with phenols which must contain a replaceable hydrogen atom in the o- or p-position to the phenolic hydroxyl group and may contain methyl and halogen groups as substituents, to form, under splitting off of water and formation of a further sulphone linkage, hydroxypolyaryl sulphones of the probable formula:

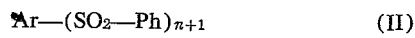

wherein Ar, Ph and $n$ have the meanings given above. For example, phenol, o-, m- and p-cresol, o- and p-chlorophenol or mixtures of these phenols may be used. The upper limit of the reaction temperature is determined by the occurrence of discolouration at too high a temperature. It has been found that in general the temperature should not exceed 190° C. if light condensation products are to be obtained; a temperature of 160–180° C. is favourable. The polysulphones obtained according to the method described are difficulty soluble in water and have no tanning properties. Components with 2 to 5 sulphone groups can be isolated by chemical and physical analysis of the technical mixture; a smaller amount of even higher molecular compounds is also very probably present. The condensation is easily performed and yields of over 90% of the theoretical are obtained. The possibility of introduction of phenol radicals into the hydroxypolyarylsulphone sulphonic acids usable according to the present invention under the formation of sulphone links is surprising in view of the fact that, for example, it has never been possible previously to produce naphthyl-hydroxyphenyl sulphones from naphthalene monosulphonic acids and phenol under the reaction conditions described. Always only dihydroxydiphenyl sulphones were obtained from the reaction mixture under distillation of naphthalene.

The subject of the present invention, therefore, is a process for the production of water soluble condensation products with a tanning action by the use of components described above. It is characterised by reacting formaldehyde or agents giving off formaldehyde in an aqueous alkaline medium at a raised temperature with a mixture of hydroxypolyarylsulphone sulphonic acids and hydroxypolyaryl sulphones. The mixture of hydroxypolyarylsulphone sulphonic acids which contain at most one nuclear bound hydroxy group per phenyl radical is produced from phenol sulphonic acids with at least one replaceable hydrogen atom in the o- or p-position by heating in the vacuum at a temperature exceeding 150° C. with at most an equimolecular amount of sulphonic acids of the benzene and/or naphthalene series, among which also phenol sulphonic acids are to be understood and which may also contain halogen and/or methyl groups as substituents. The hydroxypolyaryl sulphones are obtained from hydroxypolyarylsulphone sulphonic acids as defined above by heating in the vacuum at a temperature exceeding 150° C. with an amount of phenol calculated on the sulphonic acid groups present, which phenol has at least one replaceable hydrogen atom in the o- or p-position to the hydroxyl group. If necessary the solubility of the condensation products so obtained may be increased by after-treatment with the soluble salts of sulphurous acid and/or with aromatic sulphonic acids or their soluble condensation products.

The new condensation products produce completely white leather which is very fast to light of an even better fullness than that produced by the condensation products obtained according to the first mentioned process. The condensation products according to this invention in which Ar of the Formulae I and II represents a naphthyl radical are very good, and, from an economic point of view, very interesting tanning agents, whilst those in which Ar represents a hydroxyphenyl radical are the most active, and, therefore, the most technically valuable tanning agents according to the invention.

In the process according to the present invention, it is not necessary to begin from exactly defined starting materials; it is of much more advantage to use the technical mixtures directly obtained. Also, it is not necessary to produce the hydroxypolyarylsulphone sulphonic acids and the hydroxypolyaryl sulphones separately. A technically very simple and therefore preferred method of performing the process according to the invention consists rather in heating phenol sulphonic acids or the mixture of phenol sulphonic acids in the vacuum at 150–190° C., preferably at 160–180° C. for some hours, e. g. 8 to 10 hours, with at most the equivalent amount but preferably a lesser amount of another aromatic sulphonic acid usable according to the invention. The number of sulphonic acid groups present in the condensation product are determined, preferably electrometrically, and then only a partly corresponding amount of a phenol usable according to the present invention is added to one of the sulphonic acid groups present. The reaction mass is then further condensed in the vacuum at 150–190° C., preferably at 160–180° C. to form the hydroxypolyaryl sulphones. The technical mixture of hydroxypolyarylsulphone sulphonic acids and hydroxypolyaryl sulphones obtained direct in this manner in an aqueous alkaline solution, preferably of a pH of 7.5 to 9 and in the most concentrated solution possible is condensed with formaldehyde or agents giving off formaldehyde to form the water soluble end products according to this invention by heating, preferably under reflux at 100–105° C.

No connection between the tanning action of the new condensation products, which are higher molecular mixtures, and the ratio of the statistic average of the sulphonic acid groups present to the total amount of sulphur could be determined. On the other hand, the dependence of water solubility of the end product on the degree of sulphonation was shown insofar as good water soluble tanning agents according to the present invention are obtained if 25–50% of the sulphonic acid groups are still present direct after the first condensation step in the preferred method of performing the process are further condensed with phenols. If, on the other hand, in the mixture of hydroxypolyarylsulphone sulphonic acids and hydroxypolyaryl sulphones to be condensed with formaldehyde, the latter component is preponderant, that is for example, if 50–80% or even more of the sulphonic acid groups present after the first condensation in the vacuum in the preferred method of performing the process according to this invention, are further condensed with phenols, end products may result, the water solubility of which is too slight for practical purposes. Such too slightly water soluble condensation products according to this invention can easily be converted into sufficiently soluble products by after-treatment with water soluble salts of sulphurous acid without loss of their tanning properties. The water soluble salts of sulphurous acid can be produced in an aqueous solution or suspension in the warm at usual or under increased pressure. It should be emphasised here that in contrast to the known process, the condensation with formaldehyde and treatment with salts of sulphurous acid cannot be performed at the same time. A second process for increasing the solubility of the insufficiently water soluble condensation products mentioned consists in treating these products after the formaldehyde condensation with aromatic sulphonic acids or soluble condensation products thereof.

The new condensation products are mostly strongly electrolyte-sensitive so that they can be brought advantageously to the pH value required for use by precipitation from their aqueous solutions by acidification with mineral acid, freeing from the salts mixed therewith by separating the precipitated resin, again dissolving in water and adding organic acids.

The new condensation products can be used not only as synthetic tanning agents but also as textile auxiliary products or as components for the production of textile auxiliary products.

The following examples illustrate the invention without limiting it in any way. Where not otherwise stated, the parts are given as parts by weight and the temperatures are in degrees centigrade.

Example 1

440 parts of 66% oleum are slowly added at 60–70° to 500 parts of melted phenol and the whole is then sulphonated for 1 hour at 100°. The phenol sulphonic acid formed is then slowly heated in the vacuum to 160–165° at about 11–13 mm. Hg so that only a little phenol distills off and then kept at this temperature until 1 gramme of the condensation product makes 3.5 to 3.7 ccm. of 1-n caustic soda lye neutral to Congo red. 90–100 parts of phenol are added to the condensation product obtained in this way, and after the phenol has been well mixed in, the reaction mass is again placed in the vacuum and kept there at 165° until 1 gramme of the condensation product makes only 2.7–2.5 ccm. of 1-n caustic soda lye neutral to Congo red. Yield=about 900–940 parts.

Similar condensation products are obtained if instead of 500 parts of phenol, homologous phenols are used, e. g. o- or m-cresol or technical mixtures of the two cresols.

100 parts of the condensation product obtained are carefully melted with about 41 parts of 40% caustic soda lye, 20–22 parts of 37% formaldehyde are added and the whole is condensed at 100–105° until (about 6 hours) a sample diluted with a little water remains clear on acidification with diluted sulphuric acid. The reaction mass is then diluted with 30 parts of water, the tanning agent is precipitated with 40% sulphuric acid and Glauber's salt and the precipitated resin is well squeezed out. The resin which is poor in salt and neutral to Congo red is dissolved in a little water and acidified with 8 parts of 80% acetic acid.

This tanning agent is excellently suited for the production of white leather.

Example 2

The condensation product produced according to Example 1 from 500 parts of phenol (titer 3.5–3.7) is reacted in the vacuum at about 150° with 100–130 parts of raw cresol DAB IV. The reaction is continued at 150° until 1 gramme of the condensation product neutralises only 2.2–2.5 ccm. of 1-n caustic soda lye to Congo red. Yield=920–960 parts.

100 parts of this condensation product are carefully melted with 40 parts of 40% caustic soda lye and condensed for 6 hours at 100–105° with 20–22 parts of 37% formaldehyde. A sample diluted with water should remain clear on acidification with diluted sulphuric acid. The reaction mass is then worked up in the manner described in Example 1. A product with similar properties to that described in Example 1 is obtained.

Either the single cresols or other substituted phenols which have at least one replaceable hydrogen atom in the p- or o-position to the phenolic hydroxyl group such as o-chlorophenol can be used for the above reaction instead of raw cresol.

Example 3

The condensation product obtained from 500 parts of phenol as described in Example 1 (titer 3.5–3.7) is reacted with 200–220 parts of phenol at 165–170° as described in Example 1. After the reaction only 1.6–1.7 ccm. of 1-n caustic soda lye are necessary to neutralise 1 gramme of the condensation product to Congo red. Yield about 1,000 parts.

100 parts of the condensation product obtained are carefully melted with 34 parts of 40% caustic soda lye and heated with 23–24 parts of 37% formaldehyde for 4½ hours at 100–105°. After this time 25 parts of 25% sodium bisulphite solution are added and the whole is heated for a further 6 hours at 100–105°. A sample diluted with water and acidified with diluted sulphuric acid must remain clear. The product obtained is diluted with 30 parts of water and precipitated with diluted sulphuric acid and sodium sulphate. The precipitated resin is thoroughly squeezed out in order to free it from the salts mixed therewith. The resin which is poor in salt and neutral to Congo red is dried, milled and mixed with 5 parts of oxalic acid.

The reaction with sodium bisulphite can also be performed advantageously at 150° under pressure, the further working up being performed in a manner similar to that described above.

The leather produced with this product is distinguished by its fullness, softness and fastness to light.

The formaldehyde condensation product obtained can also be made soluble by after-treatment with aromatic sulphonic acids or soluble condensation products thereof. If in the above example, the 25 parts of bisulphite are replaced by 50 parts of β-naphthalene sulphonic acid and heating is performed for 1½ hours at 100–105°, an easily water soluble condensation product is obtained. After the treatment the product is diluted with 100 parts of water, the solution is brought to pH 3.5 with ammonia and then 10 parts of acetic acid 80% are added. In this way a product with similarly good tanning properties is obtained.

Raw cresol, the single cresols or other substituted phenols having a reactive hydrogen atom in the p- or o-position to the hydroxyl group may be used instead of phenol. The reaction temperature is either reduced or increased according to the components used.

*Example 4*

264 parts of 66% oleum are slowly added to 300 parts of molten naphthalene and the whole is sulphonated for 4 hours at 135°. After this time, the sulphonation mass is cooled to 90° and then first 300 parts of phenol and then 264 parts of 66% oleum are slowly added. The whole is then stirred at 100–105° for 1 hour. The sulphonic acid mixture so obtained is heated slowly in the vacuum to 165° at about 11–13 mm. Hg and condensed at this temperature until (about 20 hours) 1 gramme of the reaction mass neutralises 3.5–3.7 ccm. of 1-n caustic soda lye to Congo red. The condensation mass is then well mixed with 100–120 parts of phenol and the further reaction is performed in the vacuum at 165° until 1 gramme of the condensation product neutralises 2.5–2.7 ccm. of 1-n caustic soda lye to Congo red. Yield about 1050 parts.

100 parts of the above condensation product is carefully melted with about 40 parts of 40% caustic soda lye and condensed with 18 parts of 37% formaldehyde at 100–105° under reflux until (about 7 hours) a sample diluted in a little water remains clear when acidified with diluted sulphuric acid. On completion of the condensation, the product is worked up as described in Example 1.

Toluene may also be used instead of naphthalene. Further, instead of phenol, raw cresol or other phenols having at least one reactive hydrogen atom in the p- or o-position to the hydroxyl group may be used for the reaction of the condensation product obtained (titer 3.5–3.7).

*Example 5*

35 parts of a naphthylhydroxy-polyphenyl sulphone— obtained as described in Example 4 by heating equivalent amounts of naphthalene and phenol sulphonic acids in the vacuum at 165° until 1 gramme of the condensation product neutralises about 3.5 ccm. of 1-n caustic soda lye to Congo red and thereafter reacting the still free sulpho groups with phenol in the vacuum at 180° until no further decrease in acidity occurs, after which the polysulphone obtained is washed free of acid and dried— and 65 parts of a hydroxypolyphenylsulphone sulphonic acid obtained by heating phenol sulphonic acid to a titer of 3.5 as described in Example 1 are carefully melted together with about 40 parts of 40% caustic soda lye. 22 parts of 37% formaldehyde are added and the whole is condensed at 100–105° until (about 7 hours) a sample dissolved in a little water remains clear on acidification with sulphuric acid. The product so obtained is worked up as described in Example 1 and has properties similar to those of the product described in that example.

If, in this example, the sulphone component is so increased that after the formaldehyde condensation the condensation product is no longer sufficiently water soluble, the water solubility can be greatly improved by an after-treatment with bisulphite or with aromatic sulphonic acids or soluble condensation products thereof as described in Example 3.

*Example 6*

The hides prepared in the usual way are tanned after bating in drum or paddle with 150–200% of water (calculated on the weight of the halides) and 60% of the tanning agent obtained according to Example 1. The tanning agent is added in portions. Tanning is complete after 48 hours. The leather is rinsed, greased and prepared in the usual way. In this way full white and fast to light leather is obtained.

What I claim is:

1. A tanning agent obtained by reacting formaldehyde in an aqueous alkaline medium at a raised temperature with a mixture of a hydroxypolyarylsulphone sulphonic acid corresponding to the formula

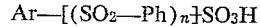

wherein Ar represents an aromatic radical selected from the group consisting of hydroxyphenyl, cresyl and naphthyl, Ph represents a radical selected from the group consisting of hydroxyphenyl and cresyl, and $n$ represents a whole number greater than 1, and a hydroxypolyarylsulphone corresponding to the formula

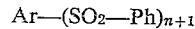

wherein Ar, Ph and $n$ have the meanings defined above.

2. A tanning agent obtained by reacting formaldehyde in an aqueous alkaline medium at a raised temperature with a mixture of a hydroxypolyarylsulphone sulphonic acid corresponding to the formula

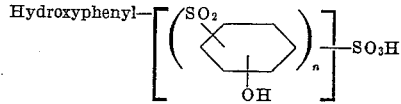

wherein $n$ represents a whole number greater than 1, and a hydroxypolyarylsulphone corresponding to the formula

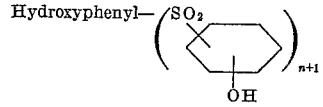

wherein $n$ has the meaning defined above.

3. A tanning agent obtained by reacting formaldehyde in an aqueous alkaline medium at a raised temperature with a mixture of a hydroxypolyarylsulphone sulphonic acid corresponding to the formula

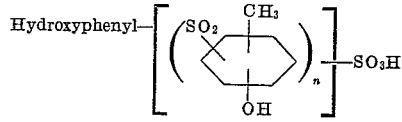

wherein $n$ represents a whole number greater than 1, and a hydroxypolyarylsulphone corresponding to the formula

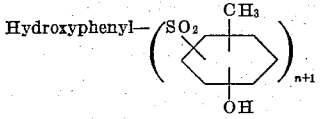

wherein $n$ has the meaning defined above.

4. A tanning agent obtained by reacting formaldehyde in an aqueous alkaline medium at a raised temperature with a mixture of a hydroxypolyarylsulphone sulphonic acid corresponding to the formula

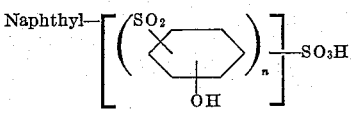

wherein $n$ represents a whole number greater than 1, and a hydroxypolyarylsulphone corresponding to the formula

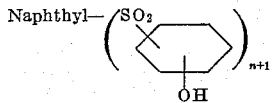

wherein $n$ has the meaning defined above.

5. A tanning agent obtained by reacting formaldehyde in an aqueous alkaline medium at a raised temperature with a mixture of a hydroxypolyarylsulphone sulphonic acid corresponding to the formula

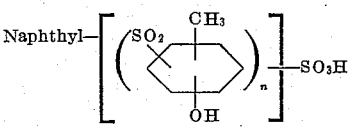

wherein $n$ represents a whole number greater than 1, and a hydroxypolyarylsulphone corresponding to the formula

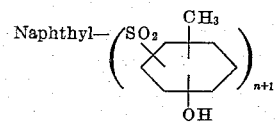

wherein $n$ has the meaning defined above.

6. A tanning agent obtained by reacting formaldehyde in an aqueous alkaline medium at a raised temperature with a mixture of a hydroxypolyarylsulphone sulphonic acid corresponding to the formula

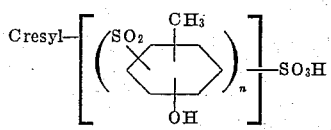

wherein $n$ represents a whole number greater than 1, and a hydroxypolyarylsulphone corresponding to the formula

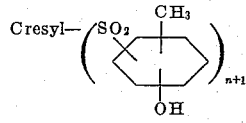

wherein $n$ has the meaning defined above.

References Cited in the file of this patent

UNITED STATES PATENTS

| | | |
|---|---|---|
| 1,901,536 | Schafer | Mar. 14, 1933 |
| 1,988,985 | Schafer | Jan. 22, 1935 |
| 2,171,806 | Russell | Sept. 5, 1939 |
| 2,271,245 | Biedermann | Jan. 27, 1942 |

FOREIGN PATENTS

| | | |
|---|---|---|
| 686,905 | Germany | Jan. 18, 1940 |